United States Patent [19]

Bohin et al.

[11] 4,096,541
[45] Jun. 20, 1978

[54] MINIATURE LIGHTNING PROTECTOR

[75] Inventors: Jean A. Bohin, Lannion; Max Goldman, Gif-sur-Yvette, both of France

[73] Assignees: Etat Francaise, Issy les Moulineaux; Agence Nationale de Valorisation de la Recherche (ANVAR), Neuilly sur Seine, both of France; part interest to each

[21] Appl. No.: 766,543

[22] Filed: Feb. 7, 1977

[30] Foreign Application Priority Data

Feb. 13, 1976 France .............................. 76 04005
Dec. 15, 1976 France .............................. 76 37698

[51] Int. Cl.² .......................................... H02H 3/22
[52] U.S. Cl. ........................... 361/120; 313/220; 313/245; 313/308; 315/60; 361/124
[58] Field of Search .............. 361/119, 120, 118, 117, 361/129, 124, 125; 313/217, 220, 308, 231.1, 291, 244, 245, 249, 251, 325; 337/28, 29, 31, 32, 33, 34; 315/36, 60

[56] References Cited

U.S. PATENT DOCUMENTS

| 2,089,555 | 8/1937 | Hull et al. | 361/118 X |
| 3,679,939 | 7/1972 | Nitta et al. | 361/129 |
| 3,900,767 | 8/1975 | Person | 361/118 |
| 3,961,225 | 6/1976 | Tachibana et al. | 361/118 |

Primary Examiner—Patrick R. Salce

[57] ABSTRACT

An overvoltage protection circuit, in particular for protection against lightning. It comprises, in an ionizable atmosphere, three electrodes in the form of plates secured to an insulating support. One of the said electrodes is a discharge ignition electrode penetrating into a discharge gap between the two other electrodes, which are discharge electrodes. One of the two latter is connected to the ignition electrode through an electrical resistor. The assembly of the electrodes is located inside a case filled by the said atmosphere and inside which the electrodes and resistor are secured to a plate of insulating material which constitutes the said insulating support.

16 Claims, 8 Drawing Figures

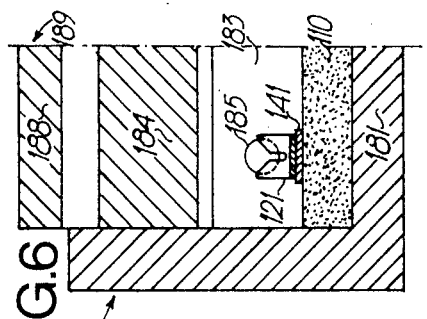
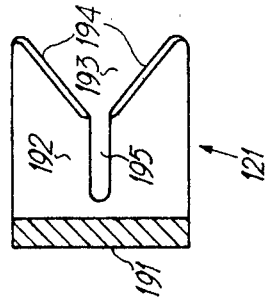
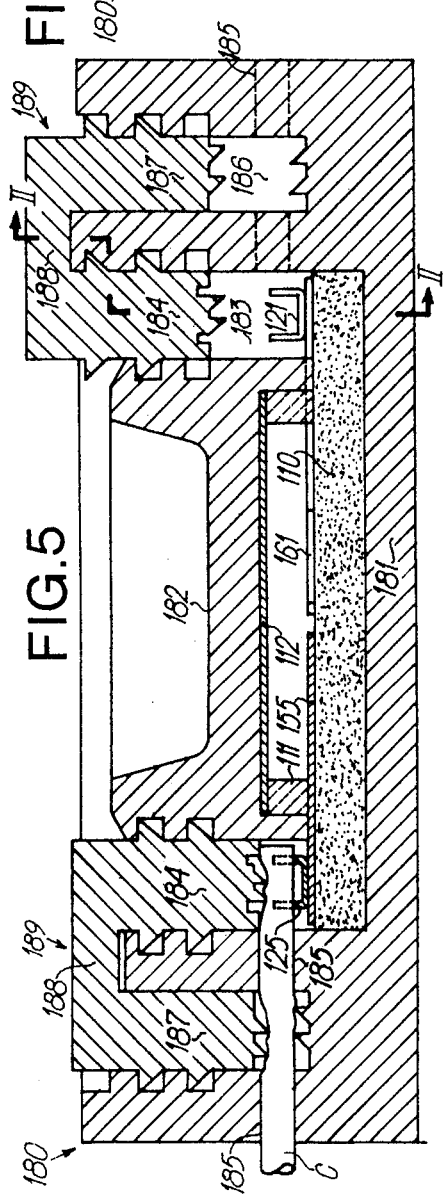
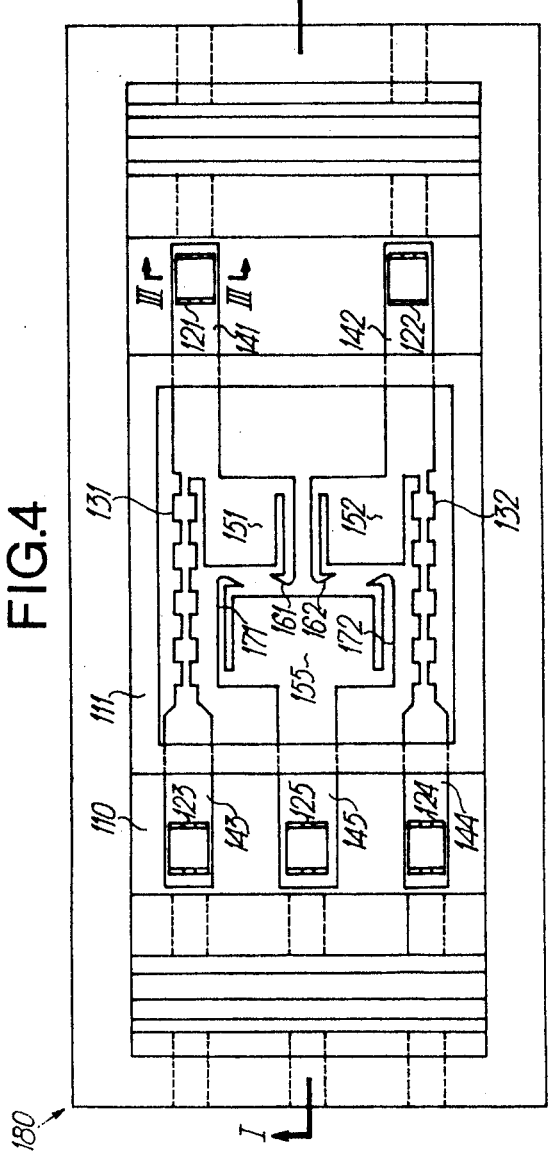

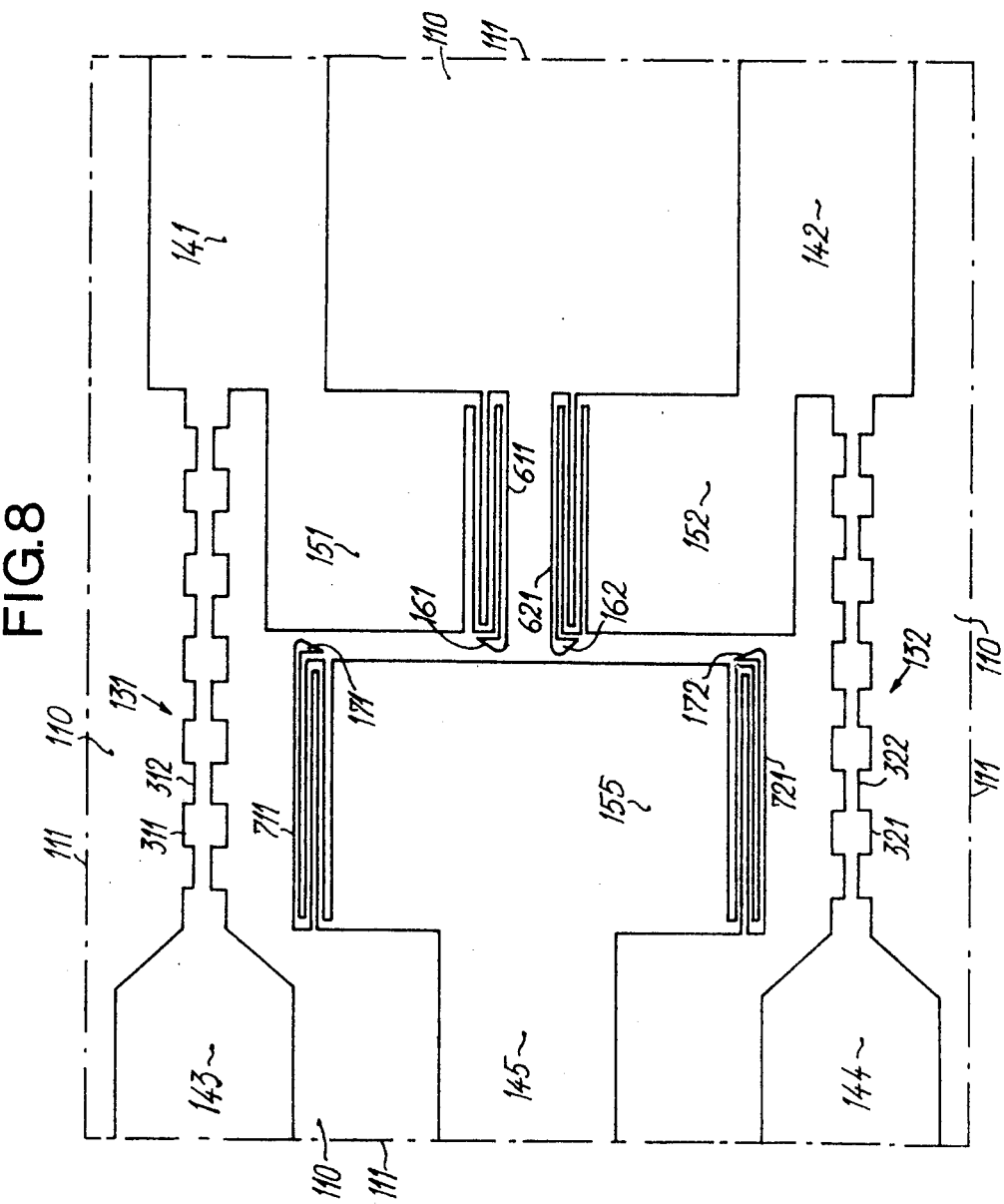

MINIATURE LIGHTNING PROTECTOR

CROSS REFERENCES TO RELATED APPLICATIONS

The Applicants hereby make reference to their French Pat. Application Nos. PV 76 04 005 of Feb. 13, 1976 and PV 76 37 698 of Dec. 15, 1976 and claim priority thereunder, following the provisions of 35 U.S.C. 119.

BACKGROUND OF THE INVENTION

1. Field of the Invention

The invention concerns a miniature lightning protector, i.e. a miniaturized lightning protection device of the type which absorbs, by a short-circuiting electrical discharge, overloading caused by phenomena of atmospheric or other origins (lightning, inductions, accidental contact, etc..) and which may occur across the terminals of units, circuits or electrical or electronic installations, normally operating on low current, for example, subscriber telephone installations.

2. Description of Prior Art

The miniature lightning protectors, especially those intended for the protection of subscriber telephone installations, must conform relatively severe requirments concerning their operating characteristics and dimensions. Those most commonly used comprise two discharge electrodes, in a sealed box, which contains a radioactive gaseous atmosphere. The discharge is therefore absorbed in a short time, because of the high probability of the presence of at least one germ electron in the gap between the electrodes, at the time when an overload wave occurs.

These current types of miniature lightning protectors are normally mounted, when intended to protect subscriber telephone installations, in junction boxes which contain, integral with a case or a panel, five screw terminals, two removable fuses and two removable lightning protectors. Two of the terminals connect the box with the two line conductors connected to the network. Two others are connected to the two conductors of the subscriber installation and the last one is connected to a local ground. The two fuses are respectively connected between one of the network terminals and one of the installation terminals. The two lightning protectors, which are respectively connected between one of the line terminals and the ground terminal, are intended to shunt the line current to ground, in the case of a sudden overload, due, for instance, to a lightning strike. This type of junction box has several disadvantages. Its structure is heterogeneous and its arrangement is consequently complicated, its installation and removal take a relatively long time, and the protection which it provides is uncertain.

The structure of the said type of junction box is heterogeneous because it is made from an assembly of parts which must undergo very different mechanical or electrical stresses and which are consequently made of different materials. Without even mentioning insulating materials, when a box is installed, up to seven combinations of different types of alloy or metal could be mentioned (for example nickel-plated copper-brass, nickel-plated brass and cadmium-plated steel, cadmium-plated steel and stainless steel, etc..) resulting from contacts being made by clamping or brazing. Production is all the more complicated that the fuses and lightning protectors are separate interchangeable components, which are produced separately. The result of all this, among other unfavorable consequences, is an irregular resistance to corrosion and expensive manufacture.

The installation and removal are long, as they involve many different operations, including the fixing of the base of the case by screws and plugs on a building wall, the trimming and uncovering of the five conductors, their clamping by terminal screwing, installation of the fuses and lightning protectors and the fixing of the box cover. In addition, as a precautionary measure and especially in rural areas, the box should preferably be placed high on an outside wall, above the ground, so that it is impossible for a person to touch the box accidentally. This does not facilitate operations.

The protection provided is not sure for several reasons. The geometry of the components is unsuited to pulse operation. For example, a fuse wire and the plugs which are soldered onto it form a turn of a coil which, during high overload pulses, may be subjected to violent internal mechanical reactions, which may break the soldered joint, i.e. destroy the fuse, while the pulse itself was too short to be dangerous.

Generally, a correctly calculated fuse is also fragile due to the fact that the wire is very fine and made of silver-tin alloy, which is mechanically very weak. Therefore, in order to limit the service engineers' traveling, there is an unfortunate tendency to use oversize wire, especially in rural areas, i.e. exactly where the lines are the most exposed to lightning strikes. Thus, the fuses no longer fulfil their protective role.

In addition, it should be noted that the failure of a fuse is not shown on the switchboard. The failure can only be detected when the subscriber calls from another telephone, which may be far from his own.

SUMMARY OF THE INVENTION

The object of the present invention is a miniature lightning protector, which:

does not require the use of a radio-active atmosphere and consequently does not cause any safety problems during manufacture, storage or replacement, or any ageing problems;

can also be used as a circuit-breaker fuse, in order to provide protection against both voltage overload and current overlaod;

protects an installation with several conductors, thus serving as a junction box;

may be quickly and easily installed and removed, thus offering an improvement, compared with conventional junction boxes.

In its simplest form, the lightning protector of the invention comprises, in a case enclosing an atmosphere, an insulating plate and an electrical circuit including the following components:

a first discharge electrode connected to first connection means across the case, a second discharge electrode connected to second means of connection across the case, and separated from the first discharge electrode by a discharge gap, a first discharge ignition electrode, penetrating into the discharge gap, and an electrical resistor, connecting the ignition electrode to the first discharge electrode.

The lightning protector of the invention is further characterized by the fact that the said components are metal blades secured flat on one side of the plate.

In this type of embodiment, the invention device may be connected between one input terminal of the component or circuit to be protected and a ground terminal, to provide protection against overloads of a given polarity.

The invention further offers the advantage of the possibility of adding a second ignition electrode to the electrical circuit, which also penetrates into the discharge gap, and a second electrical resistor coupling the second ignition electrode to the second discharge electrode. Thus, the lightning protector provides protection against overloading of the polarity opposite to said given polarity.

In addition, the invention still further offers the possibility of adding to the electrical circuit a circuit-breaker fuse which also comprises a metal blade fixed flat on the same side of the insulating plate and connected between one of the discharge electrodes and third means of connection. The invention device is then capable, when connected in series, using the first and second means of connection, with the component or circuit to be protected, and if the third means of connection are grounded, of providing protection against both voltage overloads and current overloads.

The invention also offers the possibility of placing two lightning protector electrical circuits on the same plate, thus providing protection for a two conductor installation, for example a subscriber telephone.

It also offers the advantage that all blades forming the components may be made of the same metallic material and have the same thicknesss, thus allowing the circuits to be produced using a known process and with a very small number of operations, for example by metallic plating of the plate followed by electro-erosion and finishing or selective chemical machining, or even by vacuum blasting with masking.

Other advantageous features, notably concerning the placing of lightning protector of the invention inside a plastic case while clearing the quick clamp connection terminals fixed to the connection blades will be described, together with the resulting advantages, in the following description, given as an example of the embodiment forms of the said device, referring to the drawing in which:

BRIEF DESCRIPTION OF THE DRAWING

FIG. 4 is a large-scale view of another embodiment form comprising a two pole lightning protector with fuses and connections allowing it to advantageously replace conventional types of junction box;

FIG. 5 is a longitudinal section of the same lightning protector, in the I—I cross-section plane of FIG. 4;

FIG. 6 is a half cross-section of the same lightning protector in the II—II plane of FIG. 5;

FIG. 7 is a larger scale section of a connection terminal of the same lightning protector, in the III—III plane of FIG. 1; and FIG. 8 is a larger scale and more detailed view of a part of FIG. 4.

DESCRIPTION OF PREFERRED EMBODIMENTS

Figure 1:
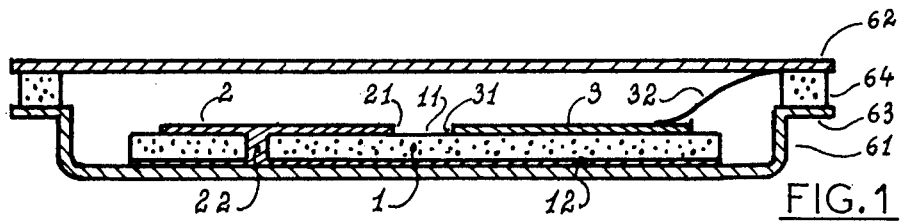
FIG. 1 is an elarged cross-section, in the X—X plane in FIG. 2, of an intial embodiment designed for replacing conventional types of miniature lightning protectors in the junction boxes of subscriber telephone installations.
Figure 2:
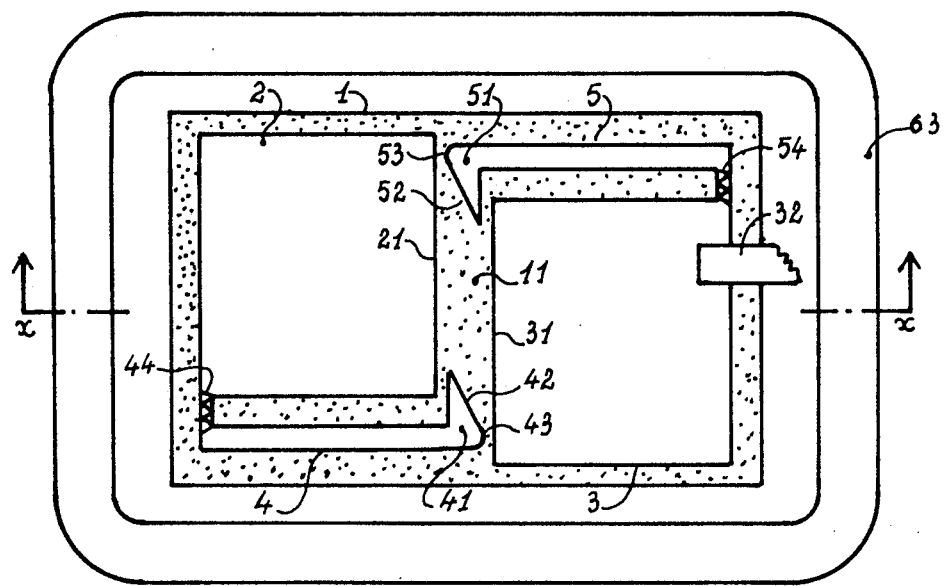
FIG. 2 is a plan view, to the same scale, of the miniature lightning protector of FIG. 1, certain elements of which have been omitted.

Firstly, consider FIGS. 1 and 2. Elements 62 and 64, the purpose of which will be defined later, in FIG. 1, are not shown in FIG. 2. A supporting plate, 1, of insulating material, carries metal blades 2, 3, 4 and 5 on one of its sides (top side in FIG. 1). Blades 2 and 3 are generally rectangular in shape and their respective edges 21 and 31 are opposite, and approximately parallel. Blade 4 penetrates into gap 11 between edges 21 and 31, by a thin strip, 41. The shape of this strip includes, opposite edge 31, an edge 42 which is substantially straight. Considering FIG. 3, it will be seen that edge 42 is so positioned, in relation to edge 31, as to make an acute angle, $a$, opening towards gap 11. Edge 42 is connected, at its end opposite gap 11, to a rounded apex, 43, with an average radius, $r$, separated from edge 31 by a distance, $d$, which is noticeably less than the average width, D, of gap 11.

Blade 5 penetrates into gap 11, through the opposite end of that into which strip 41 is inserted, by a thin strip, 51, arranged and fitted in relation to side 21 of blade 2, in the same way as strip 41 fits in relation to side 31 of blade 3.

Blades 4 and 5 are respectively connected to blades 2 and 3, by electrical resistance couplings 44 and 54, the role of which will be defined later on.

Against the bottom of insulating support 1, a blade or metallic layer, 12, is applied in electrical contact with blade 2, by stud 22, inserted into a hole through the insulating support. Conductor 32 (wire or metallic tape) is brazed onto blade 3.

The assembly described above is fitted into a metal cover formed by case 61, upon the base of which support 1 is fixed by brazing the metal layer 12, and by a cover, 62. A ceramic frame, 64, is inserted and brazed between the folded edge, 63, of case 61, and the cover 62. Conductor 32 is clipped and brazed between cover 62 and the frame, 64. Preferably, the closed cover should contain a low pressurized atmosphere, more details of which will be described later on.

After closing, the miniature lightning protector thus comprises two conductor sub-assemblies, insulated from each other, in a controlled atmosphere. These are, firstly, electro-blades 2 and 4 coupled through resistor 44 and connected to case 61, and secondly, electrode-blades 3 and 5 coupled through resistor 54 and connected to the cover, 62.

Figure 3:
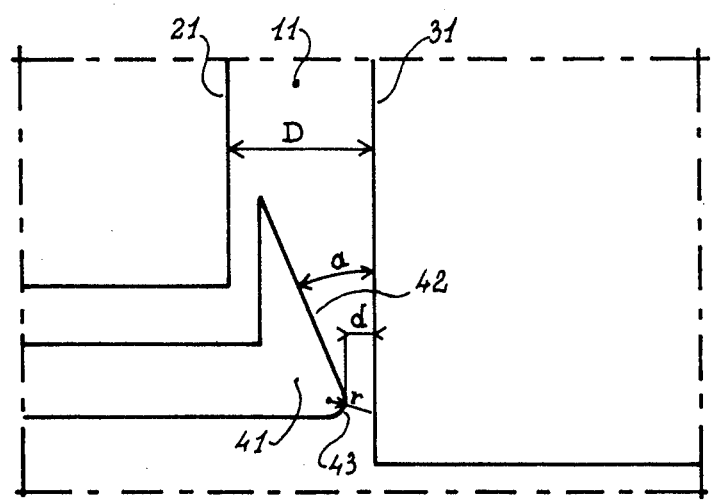
FIG. 3 is an enlarged detail view of FIG. 2.

If a negative voltage is applied to case 61, with respect to the cover 62, and if this voltage exceeds a threshold which depends upon factors already mentioned, then electrode 4, acting as a cold cathode, outputs electrons through the apex 43, towards edge 31 (FIG. 3). These electrons ionize closely located gaseous molecules and the discharge propagates by next to next ionization between edges 42 and 31 and settles between edges 21 and 31. The purpose of resistor 44 is to limit the current in electrode 4, in order to avoid damaging it when the discharge takes place. Thus, a miniature lightning protector according to the invention, only comprising electrodes 2, 3 and 4 would act as a single-polarity protection device. A two-polarity device could be produced by connecting two similar miniature lightning protectors, head to tail. However, the same result is obtained much more simply by adding electrode 5.

As mentioned above, the miniature lightning protector in FIGS. 1 and 2 is designed to be used in the blade contact systems used in subscriber installations, but can easily be modified for plugging-in, by cutting the cover or by brazing pins onto the cover.

The invention also allows overload protection circuits to be produced at the same time as the components or circuits to be protected. Firstly, it is possible to produce and apply the conductor plates by many known processes, for example by cutting and sticking, or also be chemical electrolytic or cathode plating, etc., with the shape of the plates being obtained during the deposit, by masking, or after the deposit, by selective chemical attack, electro-erosion, etc.. Secondly, the insulating support material may be selected from a wide range (epoxy resin and glass fibre laminates, glass, silica, ceramic, alumina, etc.).

Also, it is possible for example, to produce a circuit element, according to the invention, on a printed circuit, at the same time as the connections of the components to be protected. It is even possible to produce "in situ" a circuit element, using the invention, within an integrated circuit. These possibilities, together with the fact that the device dimensions may be extremely small, allow telephone cable heads to be produced, for example, in which the protection circuits are incorporated, thus substantially reducing the number of mechanical contacts which are known to be an almost permanent cause of operating faults.

Although it is not prohibited, in principle, to design circuit elements according to the invention, operating in the open air, i.e. using the ionization of the air molecules close to the electrodes, it is generally preferable, to obtain a reaction to relatively weak overloads in conditions which can be sufficiently reproducible, to use a low pressure single-atom gas as an atmosphere. In this case, a protection cover is provided covering, where applicable at the same time, the protection circuit element and the elements or components to be protected.

It is also of interest that:

(a) to avoid premature damage to the electrodes, they should be made from an alloy or metal having a very low evaporation rate in the atmosphere selected, (b) to avoid having to reduce the radius $r$ and the distance $d$ (FIG. 3) to values which are difficult to obtain, an alloy or metal should be selected with a low electron output rate, which should be less than 5 eV.

Some test results obtained using a circuit as shown in FIGS. 1, 2 and 3 are shown below, in which electrodes 2, 3, 4 and 5 are of an alloy, the electron output rate of which is approximately 4.5 eV (iron - nickel - cobalt - molybdenum alloy or nickel over a sub-layer of chromium) with a vitrified alumina support. The atmosphere used is pure argon under an absolute pressure of 80 torrs. Distance D is 400 micrometers, distance $d$ is 10 micrometers and radius $r$ is 40 micrometers. Angle $a$ is between 30° and 60°. Using such a circuit, the static ignition voltage is 230 V and the arc voltage reaches approximately 20 V. If a voltage wave is applied, the slope of which is 5 kV/$\mu$s, then the ignition time is less than 150 nanoseconds, i.e. the dynamic ignition voltage is less than 750 V. For a wave with a slope of 1 kV/$\mu$s, the dynamic ignition voltage drops to the level of the static ignition voltage. The charge flows which the circuit can support depend upon the area of the main electrodes 2 and 3. If each electrode has a surface area of 0.24 cm$^2$, then the circuit will support a current of 10 kA, without damage, for a pulse of 8 microseconds increase time and 20 microseconds wide at half-amplitude.

The invention thus allows a symmetrical miniature lightning protector to be produced, on a ceramic sub-layer of 1 cm$^2$ area, supporting an energy level of approximately 350 joules, like the miniature lightning protectors now in use.

For the electrodes, the use of a low output rate metal, such as magnesium, would allow arc voltages of less than 10 V to be obtained in argon.

Now consider simulataneously FIGS. 4, 5 and 6, on one of the sides of a rectangular plate 110, made of insulating material such as vitrified ceramic or reinforced resin; there are five connection terminals 121, 122, 123, 124 and 125. Terminals 121 and 122 are each intended to take a line conductor, and both point towards one of the shorter sides of the rectangle, both being close to one of the longer sides of the rectangle. Terminals 123 and 124 are each intended to take an installation conductor. These are close to the other shorter side, with terminal 123 close to the same longer side as terminal 121 and terminal 124 close to the same longer side as terminal 122. Terminal 125, which is intended to take the ground conductor, is located between terminals 123 and 124. The composition and fixing method of these terminals will be examined, later on.

All electrical components in the box which are connected to these terminals are deposited or secured on the same side of plate 110, in the form of small plates or blades of conducting alloy. These components include:

two fuses, 131 and 132, the first of which couples terminal 121 to terminal 123 through connecting strips 141 and 143, and the second of which couples terminal 122 to terminal 124, through connecting strips 142 and 144;

two rectangular discharge electrodes 151 and 152, on each side of the center-line of plate 110, together covering an area between the half-lengths of fuses 131 and 132, located close to strips 141 and 142, and respectively connected to the said strips;

one rectangular discharge electrode 155, covering approximately the area between the other half-lengths of fuses 131 and 132, connected to ground terminal 125 by a strip 145, and the edge of which opposite the edges of electrodes 151 and 152, delimits, with these electrodes, a discharge gap of constant running width;

two ignition electrodes 161 and 162, connected respectively to electrodes 151 and 152, by resistor strips which run in the space between the said electrodes, the first one terminating in a triangular strip which is inserted between electrodes 151 and 155, and the second one terminating in a triangular strip which is inserted between electrodes 152 and 155;

finally, two ignition electrodes 171 and 172, which are respectively connected to electrode 155 by resistor strips which run on each side of the said electrode between this electrode and fuses 131 and 132, the first one of which terminates in a triangular strip which is inserted between electrodes 151 and 155 and the second of which terminates in a triangular strip which is inserted between electrodes 152 and 155.

Referring to FIG. 8, more details will be given later on, on the composition and layout of the electrodes, fuses and their connections.

A frame, 111, of insulating material stuck or soldered onto plate 110 and to the connecting strips, encloses the fuses and electrodes, while leaving the terminal clear. A cover, 112, (not shown in FIG. 5 for reasons of clarity) stuck or sealed to frame 111, thus delimits, with the frame and plate 110, an enclosed space into which, when the cover is fixed, an atmosphere of controlled composition and pressure can be introduced (dry air, argon, mixture of these two gases, etc..) in order to give the electrodes a determined level of static ignition voltage.

Plate 110 is inserted, for example by moulding, against the bottom, 181, of case 180, which is of elastomer or plastomer insulating material. A cover, 182, made of the same material and which can also be moulded, fits around frame 111 and cover 112. It is shaped and dimensioned so that, together with case 180, it forms modules, 183, with parallel opposite sides, i.e. recesses, thus leaving terminals 121, 122, ... 125, clear. These may be conventional type screw clamp terminals, being clamped by the insertion of a screwdriver into the recesses after inserting wires through the passages provided in the case 180. However, the invention allows a conductor fixing method which is much faster and more economical.

For this purpose, the terminals must be produced as shown in FIG. 7. Terminal 121, shown as an example, is a double square, of which FIG. 7 shows the base, 191, and one of the sides, 192. Base 191 is brazed to the corresponding connecting strip (in this case 141). Each branch is hollowed out, at 193, to an acute V shape, 194. The hollowing out is extended towards the base 191, by a rectangular slot, 195, with rounded-off edges and a round base dimensioned to accept the slightly tight conductor of the wire to be connected.

Concerning the recesses leaving the terminals clear, these may be blocked by the pistons, 184, the sides of which have notches fitting the openings in the sides of the recesses, to allow piston entry (for example using pliers) and preventing their removal. Then, to connect the insulated wires, all that is required is to insert them, without their having to be stripped, through the passages 185 in the sides of the end of the case (see, for example, conductor C, FIG. 5) into the openings, 193, of the terminals. Sufficient pressure exerted by the pistons, 184, will, firstly, force the wires to locate in the openings, 193, breaking the insulator on the sharp edges 194, and secondly, the wire conductors will locate with auto-tightening, into the slots 195.

It should be mentioned here that a complete protection device, using the invention, only weighs a few grams and that the wires to be connected are normally fixed to a wall. Advantage can be taken of this to provide, at the same time as the connections, the fixing of the device without any extra operations. To do this, the ends of case 180 are sufficiently thick for other recesses, 186, to be made, thus clearing part of the insulated conductor, and receiving other pistons, 187, which can be coupled to pistons 184 by the bridges 188, and the ends of which will grip the insulated wires against the bottom of the recesses, 186. Each assembly 184-187-188 then forms an integral clip, 189. The clips, 189, are not shown in FIG. 4.

Almost complete protection can be provided for the terminals and the external frame connections, 111, against the ambient atmosphere (humidity, salt fog, acid vapours, etc..) by inserting, before inserting the clips 189 in the waiting or pre-connection position (i.e. in the position shown in the right-hand part of FIG. 5), a determined quantity of water-resistant grease (for example a silicon compound) part of which will be forced into the gaps between cables and the passages, 185, during the final closing of the box, by pressure on the clips.

Examples of material selection for the various components are given below:

Plate 110 and frame 111 : vitrified ceramic

Electrode strips, fuses and connections : iron-nickel-cobalt alloy

Cover 112 : stainless steel

Connection terminals 121, 122 . . . 125 : cupro-glucinium (if the conductors are copper) or stainless steel (if conductors are aluminum)

Case 180, cover 182, clips 189 : injection-moulded resin (polyamide or polycarbonate).

The list of materials to be used in the manufacture of the invention junction box is therefore much shorter than that required by previous junction boxes. In addition, the said manufacture does not require any machining operations (apart from the cleaning up of the moulded elements and the cutting and bending of the terminals, 121, 122 . . . 125). In particular, it will be noted that none of the component elements is threaded. In fact, most of the manufacturing phases can be automatized. It will also be noticed that the list of connecting and fixing operations is reduced to setting the insulated wires to the correct length, inserting them through passages 185 and pressing clips 189, using pliers.

Now let us consider FIG. 8, in which the components are referenced by the same numbers as those used in FIGS. 4, 5 and 6. FIG. 8 represents the part of the area of plate 110 located inside frame 111. Concerning the electrode functions and characteristics, indications already given in this description will not be repeated.

Resistors 611 and 621 which respectively couple ignition electrodes 161 and 162 to the discharge electrodes 151 and 152 comprise narrow winding strips (for example, as shown in FIG. 8, or in zig-zag), like resistors 711 and 721, which couple ignition electrodes 171 and 172. This gives them a sufficiently high value, without increasing their size. Remember that their purpose is to limit the current in the ignition electrodes, in order to avoid damaging the electrodes when a discharge begins.

Concerning strips 131 and 132, which are used as fuses, these form an alternating succession of sections like 311, of given width, and sections like 312, which are narrower. If these widths are suitably calculated, one may say, taking into account the type of alloy and the thickness of the strips, that:

the current overload pulse sufficiently high and sufficiently long to damage the installation causes at least one of the narrow sections to melt. On the contrary, a high value pulse, but with a duration too short to damage the installation (for example, less than 20 nanoseconds), is damped by the impedance distribution resulting from jumping the widths between consecutive sections. The wider sections also play a mechanical part. They reinforce the link between plate 110 and the fuse assembly, thus raising the threshold of the resistance to the mechanical effects of the pulses.

In addition, the melting of a fuse element may cause sublayer metallization, favoring a short-circuit, notably between the overloaded conductor and the ground electrode 155, which is very close to it, thus causing an automatic indication of the fault to appear at the telephone exchange.

As already pointed out, the above-described embodiments, referring to FIGS. 4, 5, 6, 7 and 8 are by no ways limitative and other variants could be added.

Thus, for example, the bottom, 181, of case 180 may be made of metal, if the box is required to be mechanically stronger. The overall case may also be pressed from metal sheet and used to reinforce a polymer cover.

The resistance of the device to electrical overloading may be improved by increasing the ground connection conductor cross-sections. For example, the ground terminal could be a nut and bolt terminal secured to the end of the case and connected to the cover 112, made of metal, and itself connected to the ground electrode 155. The ground connection could also be made by means of a metal plate positioned between plate 110 and the bottom, 181, connected to a ground terminal outside the case, and also to a ground electrode, 155, by a conductor passing through plate 110.

What is claimed is:

1. Miniature lightning protector device comprising:
   a metal case formed of a metal base, a cover, a plate of insulating material and an electrical circuit supported and secured to said base on its side opposite to the components of said circuit;
   said case enclosing an atmosphere;
   said electrical circuit including components formed of metal strips which are secured in flat relationship on the same side of said insulating plate; and said circuit containing the following components:
   (a) a first discharge electrode including a first means of connection connected to the case;
   (b) a second discharge electrode including a second means of connection connected across the case to said cover;
   (c) said first and second discharge electrodes being separated by a discharge gap;
   (d) at least one discharge ignition electrode penetrating into the discharge gap; and
   (e) at least one electrical resistor coupling said ignition electrode to one of said discharge electrodes.

2. Lightning protector device as claimed in claim 1, wherein said metal strips are all of equal thickness.

3. Lightning protector device in accordance with claim 1, in which said electrical circuit contains, in the form of a metal strip fixed flat on said same side of the plate, a protection fuse against current overloading connected between said first discharge electrode and a third means of connection across the case.

4. Lightning protector device in accordance with claim 3, in which said plate supports two electrical circuits.

5. Lightning protector device in accordance with claim 4, in which said components of both electrical circuits are fixed on said same side of said plate, said second discharge electrode and its connection means being common to both circuits.

6. Lightning protector device in accordance with claim 5, in which said means of connection each contain a metal strip fixed flat on said side of the plate, and a metal electrical conductor connection terminal, fixed to the end of latter said strip, latter said terminal being a single or multiple angle piece, fixed by its base to latter end, and in the branches of which slots are provided, the edge shapes and cross-sections of which are formed and dimensioned so that, when an insulated conductor of suitable cross-section is forced in, the insulating conductor sheath is split and the conducting core is gripped, to provide electrical contact; said face of said plate being covered by an insulating frame, surrounding the circuits, leaving the terminals clear, covered by a top-cover, the case thus being constituted by said cover, frame and plate, said case being contained in a cover of plastic material, in which insulated conductor passages and recesses leaving terminals clear are provided, gripping pistons being inserted into the recesses, to press the conductors into the slots, with the recess walls and the pistons having a locking element to allow the pistons to be inserted, but preventing their removal.

7. Lightning protector device in accordance with claim 6, in which said recesses contain water-resistant grease.

8. Lightning protector device in accordance with claim 6, in the cover of which further recesses are also provided, leaving clear sections of insulated conductor, and accepting further pistons.

9. Lightning protector device in accordance with claim 8, in which a first piston and a second piston, used to grip one conductor, are coupled by a bridge, thus forming a closing clip.

10. Lightning protector device in accordance with claim 3, in which said means of connection each comprise a metal strip fixed flat on the said same side of said plate and a metal electrical conductor connection terminal secured at the end of said strip, said side of said plate being covered by an insulating frame around said circuit, leaving terminals clear and covered by a protection cover, the case thus being constituted by said cover, frame and plate.

11. Lightning protector device in accordance with claim 10, in which said terminals are single or multiple angle pieces fixed by their base to the ends of said connecting strips and in the branches of which slots are provided, the shapes and edge sections of which are shaped and dimensioned so that, when an insulated conductor of suitable cross-section is forced in, the insulating sheath on the conductor is split, and the conducting core is gripped, to provide electrical contact.

12. Lightning protector device in accordance with claim 10, also containing a cover of plastic material around the case, and in which insulated conductor passages are provided, together with recesses which leave said terminals clear.

13. Lightning protector device in accordance with claim 11, also comprising, firstly a cover of plastic material, surrounding the case, and in which insulated conductor passages and recesses leaving said terminals clear are provided, and secondly clamping pistons which can be inserted into recesses to press the conductors into the slots, said recess walls and pistons havng complementary grooves, to allow the pistons to be inserted, but preventing their removal.

14. Lightning protector device in accordance with claim 13, in which said recesses contain water-resistant grease.

15. Lightning protector device in accordance with claim 13, in the cover of which are also provided further recesses, leaving parts of the insulated conductors clear and accepting further pistons.

16. Lightning protector device in accordance with claim 15, in which a first piston and a second piston, used to grip one conductor, are coupled by a bridge, thus forming a closing clip.

* * * * *